United States Patent Office 3,532,792
Patented Oct. 6, 1970

3,532,792
DIURETIC COMPOSITIONS CONTAINING N-SUBSTITUTED - 5-SULFAMOYL-4-TRIFLUOROMETHYLANTHRANILIC ACIDS AND A 2,4,7 - TRIAMINO-6-PHENYLPTERIDINE AND METHODS OF PRODUCING DIURESIS
James W. Wilson, Wayne, Pa., assignor to Smith Kline & French Laboratories, Philadelphia, Pa., a corporation of Pennsylvania
No Drawing. Continuation-in-part of application Ser. No. 463,899, June 14, 1965. This application Sept. 29, 1967, Ser. No. 671,573
Int. Cl. A61k 27/00
U.S. Cl. 424—229
4 Claims

ABSTRACT OF THE DISCLOSURE

Diuretic compositions containing N-substituted-5-sulfamoyl-4-trifluoromethylanthranilic acids and methods of producing diuresis of administering said anthranilic acids. Also, diuretic compositions containing N-substituted-5-sulfamoyl-4-trifluoromethylanthranilic acids in combination with 2,4,7 - triamino-6-phenylpteridines and methods of producing diuresis by administering combinations of said anthranilic acids and said pteridines.

This application is a continuation-in-part of Ser. No. 463,899, filed June 14, 1965, now abandoned.

This invention relates to new N-substituted-5-sulfamoyl-4-trifluoromethylanthranilic acids which have diuretic and, in particular, natriuretic activity. These compounds are also useful in treating hypertension.

Another aspect of this invention relates to novel medicinal compositions in a dosage unit consisting of a pharmaceutical carrier and a N-substituted-5-sulfamoyl-4-trifluoromethylanthranilic acid and to methods of producing diuresis by administering said composition.

A further aspect of this invention relates to new medicinal compositions in a dosage unit consisting of a pharmaceutical carrier, a N-substituted-5-sulfamoyl-4-trifluoromethylanthranilic acid and a 2,4,7-triamino-6-phenylpteridine and to methods of producing diuresis by administering said compositions. These medicinal compositions are advantageous in that they have potent diuretic activity, in particular natriuretic activity. This activity is produced without excessive excretion of potassium, thus these compositions have a favorable sodium/potassium ratio. In addition, these compositions are advantageous in that effects produced by other diuretics such as excessive excretion of chloride which results in hypochloremic alkalosis and such as uric acid retention are not produced by these preparations. Although not determined definitely at this time, apparently these compositions act by more than one mechanism and are therefore more effective than diuretics which act by only one mechanism.

The new anthranilic acids of this invention are represented by the following formula:

FORMULA I

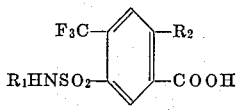

in which:

R₁ is hydrogen or lower alkyl having 1 to 6 carbon atoms and
R₂ is furylmethylamino, thenylamino, benzylamino or dibenzylamino.

Also included in this invention are carboxylic acid salts of the compounds of Formula I prepared by reacting the carboxylic acid with an inorganic or organic base such as an alkali metal hydroxide, for examplie sodium or potassium hydroxide, ammonia or benzylamine.

The anthranilic acids of this invention are prepared as follows:

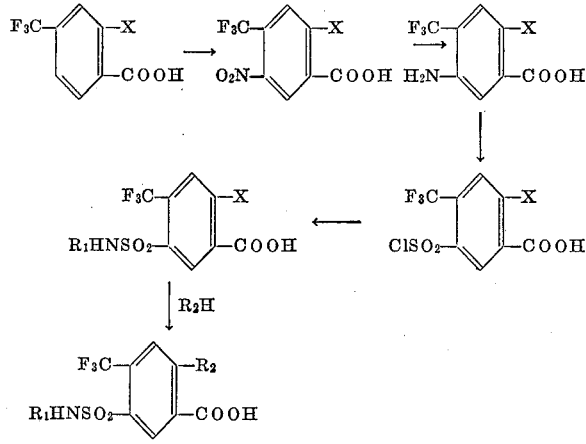

The terms $R_1$ and $R_2$ are as defined above and X is chloro or bromo.

According to the above procedure, a 2-halo-4-trifluoromethylbenzoic acid is treated with fuming sulfuric acid and fuming nitric acid to give a 2-halo-5-nitro-4-trifluoromethylbenzoic acid. The nitro group is reduced by treating with a chemical reducing agent such as iron powder in aqueous ammonium chloride to give a 5-amino-2-halo-4-trifluoromethylbenzoic acid. Treating this amino compound with concentrated hydrochloric acid and sodium nitrite followed by a solution of sulfur dioxide in acetic acid containing cuprous chloride and treating the resulting 5-chlorosulfonyl compound with ammonium hydroxide or with an alkylamine gives a 2-halo-5-sulfamoyl-4-trifluoromethyl-benzoic acid. Reacting this intermediate with the appropriate amine ($R_2H$) gives the N-substiuted-5-sulfamoyl - 4 - trifluoromethylanthranilic acids of this invention.

Alternatively, anthranilic acids of this invention are prepared by the following procedures:

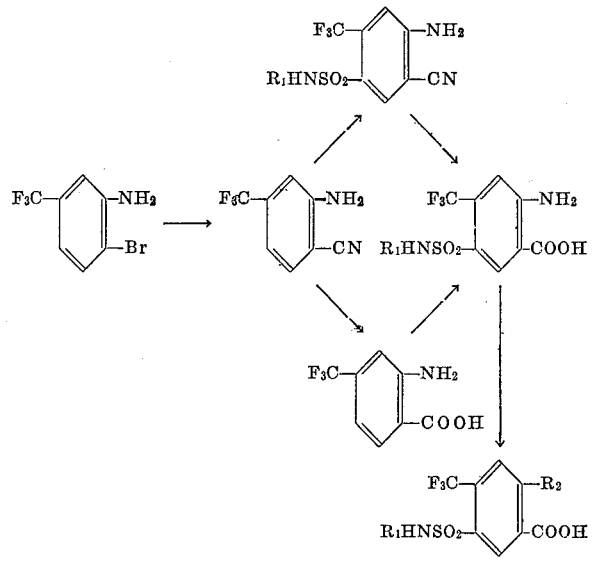

The term $R_1$ is as defined above and $R_2$ is furylmethylamino, thenylamino or benzylamino.

According to the above procedure a 2-bromo-5-trifluoromethylaniline is reacted with cupric cyanide in pyridine to give 4-trifluoromethylanthranilonitrile by strring at about 165–170° C. for about 1–2 hours.

This benzonitrile compound is then heated with an excess of chlorosulfonic acid in the presence of sodium chloride optionally in a solvent such as dichloroethane. The mixture is concentrated and treated with an excess of cold ammonium hydroxide or with an alkylamine and the organic layer is separated and the solvent removed in vacuo to give 5-sulfamoyl-4-trifluoromethylanthranilonitrile. Hydrolysis of this nitrile, for example, by refluxing with an excess of sodium hydroxide in aqueous alcohol, neutralizing or acidifying the mixture with hydrochloric acid gives the 5-sulfamoyl-4-trifluoromethylanthranilic acid.

Alternatively, the 4-trifluoromethylanthranilonitrile is converted to 5-sulfamoyl-4-trifluoromethylanthranilic acid by hydrolyzing, for example by heating with an excess of sodium hydroxide in aqueous ethanol, and then acidifying to give 4-trifluoromethylanthranilic acid which is treated with chlorosulfonic acid and then with an excess of cold ammonium hydroxide solution or an alkylamine to give the 5-sulfamoyl-4-trifluoromethylanthranilic acid.

The 5-sulfamoyl-4-trifluoromethylanthranilic acid is reacted with an aldehyde of the formula RCHO in which R is phenyl, furyl or thienyl. The reaction is preferably carried out by heating equal molar amounts of the reactants at about 120–160° C. for about 1–4 hours. Alternatively, the reaction may be carried out by heating in a solvent such as ethanol, monomethyl ether of ethylene glycol or by heating in glacial acetic acid. Reduction of the resulting Schiff base with a reducing agent such as sodium borohydride or by catalytic hydrogenation using a catalyst such as palladium on charcoal gives N-substituted-5-sulfamoyl-4-trifluoromethylanthranilic acids of the invention.

The 2,4,7-triamino-6-phenylpteridines of the medicinal compositions of this invention are represented by the following formula:

FORMULA II

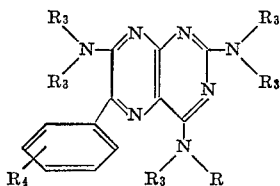

in which:

$R_3$ is hydrogen or lower alkyl having 1 to 3 carbon atoms and $R_4$ is hydrogen, lower alkyl having 1 to 3 carbon atoms, trifluoromethyl, halo or lower alkoxy having 1 to 3 carbon atoms.

The pteridines of Formula II are prepared as described in U.S. Pat. 3,081,230. Briefly, these pteridines are prepared by condensing a 5-nitroso-2,4,6-triaminopyrimidine with the appropriate phenylacetonitrile by heating in a solvent such as, preferably, dimethylformamide in the presence of a base such as anhydrous sodium methoxide. Substituted aminopteridines are prepared by reacting a 2,4,7-trichloropteridine with a substituted amine.

Medicinal compositions of this invention in a dosage unit consist of a pharmaceutical carrier and from about 5 mg. to about 250 mg. of a N-substituted-5-sulfamoyl-4-trifluoromethylanthranilic acid of Formula I. In addition, medicinal compositions of this invention in a dosage unit consist of the above compositions in conjunction with from about 5 mg. to about 250 mg. of a 2,4,7-triamino-6-pheylpteridine compound of Formula II.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule or a liquid suspension.

A method in accordance with this invention comprises administering internally to an animal organism a N-substituted - 5-sulfamoyl-4-trifluoromethylanthranilic acid of Formula I, usually combined with a pharmaceutical carrier, in an amount sufficient to produce diuresis. The active medicament will be administered in a dosage unit preferably in an amount of from about 5 mg. to about 250 mg. The route of administration may be orally or parenterally, the oral route being preferred. Advantageously, a dose will be administered from one to four times daily with the daily dose regimen being from about 5 mg. to about 1000 mg., preferably from about 10 mg. to about 750 mg.

A particularly advantageous method of this invention comprises administering the above described N-substituted-5-sulfamoyl-4-trifluoromethylanthranilic acid in conjunction with a pteridine compound of Formula II. The daily dosage regimen consists of an amount of the anthranilic acid constituent in the ranges described above the pteridine constituent in an amount of from about 5 mg. to about 1000 mg., preferably from about 5 mg. to about 600 mg. and advantageously from about 10 mg. to about 400 mg. These compositions, administered parenterally or, preferably, orally one to four times a day, produce potent diuretic activity with a wide range of effectiveness and a minimum of side effects.

The following examples are not limiting but are illustrative of the invention.

EXAMPLE 1

Five grams of 2-bromo-4-trifluoromethylbenzoic acid is added with stirring to 31 g. of fuming 30% sulfuric acid. To this mixture is added dropwise 7.7 g. of fuming nitric acid keeping the temperature below 70° C. The mixture is heated with stirring on a steam bath for two hours, then treated with a large excess of ice water and filtered to give 2-bromo-5-nitro-4-fluoromethylbenzoic acid.

To a mixture of 4.8 g. of iron powder and a solution of 2.5 g. of ammonium chloride in 40 ml. of water at 50° C. is added 4.5 g. of 2-bromo-5-nitro-4-trifluoromethylbenzoic acid. The resulting mixture is heated on a steam bath with stirring for three hours, then treated with 10% sodium carbonate, filtered, neutralized with concentrated hydrochloric acid, allowed to stand, cooled and filtered to give 5-amino-2-bromo-4-trifluoromethylbenzoic acid.

To a suspension of 4.3 g. of 5-amino-2-bromo-4-trifluoromethylbenzoic acid in 10 ml. of concentrated hydrochloric acid at 6° C. is added slowly with stirring a solution of 1.14 g. of sodium nitrite in 60 ml. of water. The resulting cold mixture is poured with stirring into 15 ml. of a saturated solution of sulfur dioxide in 15 ml. of acetic acid containing 0.2 g. of cuprous chloride. The solid material is filtered off, washed with water and then added with stirring to an excess of ammonium hydroxide. After stirring at room temperature for two hours, the solution is made acid with concentrated hydrochloric acid and the 2-bromo-5-sulfamoyl-4-trifluoromethylbenzoic acid is filtered off, washed with water and dried.

A mixture of 5.2 g. of 2-bromo-5-sulfamoyl-4-trifluoromethylbenzoic acid and 5.8 g. of furfurylamine in 50 ml. of ethylene glycol monomethyl ether is heated at reflux for three hours and then stirred into 250 ml. of 1 N hydrochloric acid. The solid material is filtered off, washed with water and dissolved in 50 ml. of 1 N sodium bicarbonate. The solution is filtered, acidified with concentrated hydrochloric acid and filtered to give N-furfuryl-5-sulfamoyl-4-trifluoromethylanthranilic acid.

EXAMPLE 2

Cuprous cyanide (23 g.) is added slowly with stirring to 21 g. of dry pyridine. The mixture is heated and stirred until the temperature reaches 125° C. and any uncomplexed pyridine is boiled off. The temperature is allowed to drop to about 110° C., and 48 g. of 2-bromo-5-trifluoromethylaniline is added slowly with stirring. The resulting mixture is heated and stirred at about 165–170° C. for 75 minutes, then cooled to 90° C. and treated with a sodium cyanide solution (75 g. in 75 ml. of water) and stirred. Benzene (250 ml.) is added and the stirring is continued for one hour. The benzene layer is removed, washed with water and dried. The solvent is removed in vacuo and the residue is distilled to give 4-trifluoromethylanthranilonitrile.

The above prepared nitrile (2.0 g.) and 0.645 of sodium chloride are added to a solution of 12.6 g. of chlorosulfonic acid in 15 ml. of dichloroethane. The resulting mixture is heated at reflux for four hours. The mixture is cooled and poured slowly onto a large excess of ammonium hydroxide and ice with stirring. The organic layer is separated from the aqueous phase and the dichloroethane is removed in vacuo to give 5-sulfamoyl-4-trifluoromethylanthranilonitrile as the residue.

5-sulfamoyl-4-trifluoromethylanthranilonitrile (2.6 g.) and 1.2 g. of sodium hydroxide in 100 ml. of aqueous ethanol are heated at reflux for four hours. The mixture is then diluted with water and acidified with dilute hydrochloric acid. The solid material is filtered off, then dissolved in dilute aqueous sodium carbonate and reprecipitated with dilute hydrochloric acid. Filtering gives 5-sulfamoyl-4-trifluoromethylanthranilic acid.

A mixture of 2.8 g. of 5-sulfamoyl-4-trifluoromethylanthranilic acid and 1.1 g. of 2-thiophenecarboxaldehyde is heated at about 140° C. for about two hours. The mixture is cooled, treated with water and filtered to give N-(2-thenylidene)-5-sulfamoyl - 4 - trifluoromethylanthranilic acid. This material is treated with 0.5 g. of sodium borohydride in aqueous methanol containing 1.0 g. of sodium carbonate. The mixture is stirred for one hour at about 40° C., diluted with water, made acid with hydrochloric acid and filtered to give N-(2-thenyl)-5-sulfamoyl-4-trifluoromethylanthranilic acid.

Treating a sample of this acid with an equimolar amount of potassium hydroxide in water gives, after evaporating the water in vacuo, the potassium salt of N-(2-thenyl)-5-sulfamoyl - 4 - trifluoromethylanthranilic acid.

EXAMPLE 3

A mixture of 10.4 g. of 2-bromo-5-sulfamoyl-4-trifluoromethylbenzoic acid (prepared as in Example 1) and 12.8 g. of benzylamine in 50 ml. of ethylene glycol monomethyl ether is heated at reflux for four hours. Stirring the mixture into 500 ml. of 1 N hydrochloric acid and working up as in Example 1 gives N-benzyl-5-sulfamoyl-4-trifluoromethylanthranilic acid.

EXAMPLE 4

By the procedure of Example 1, 10.4 g. of 2-bromo-5-sulfamoyl-4-trifluoromethylbenzoic acid and 23.5 g. of N,N-dibenzylamine in 100 ml. of ethylene glycol monomethyl are heated at reflux for three hours to give, after stirring the resulting mixture into 500 ml. of 1 N hydrochloric acid and working up as in Example 1, N,N-dibenzyl-5-sulfamoyl - 4 - trifluoromethylanthranilic acid.

EXAMPLE 5

A mixture of 12.2 g. of 4-trifluoromethylanthranilonitrile, 9.6 g. of potassium hydroxide in 40 ml. of water and 50 ml. of ethanol is heated at reflux for five hours. The solution is concentrated in vacuo, then poured onto cold aqueous hydrochloric acid. The mixture is filtered to give 4-trifluoromethylanthranilic acid.

A mixture of 10.0 g. of 4-trifluoromethylanthranilic acid is heated with 58 g. of chlorosulfonic acid at 100–130° C. for two hours. Excess chlorosulfonic acid is removed in vacuo and the resulting mixture is poured slowly with stirring and cooling into a cold aqueous ethanol solution of n-butylamine. The mixture is concentrated in vacuo and acidified with hydrochloric acid. The solid material is filtered off, dissolved in aqueous sodium carbonate and reprecipitated with hydrochloric acid to give 5-(n-butyl)sulfamoyl-4-trifluoromethylanthranilic acid.

Heating 3.4 g. of 5-(n-butyl)sulfamoyl-4-trifluoromethylanthranilic acid with 1.0 g. of furfuryl at about 140° C. for three hours and reducing the resulting N-furfurylidene compound with sodium borohydride as in Example 2 gives N-furfuryl-5-(n-butyl)sulfamoyl-4-trifluoromethylanthranilic acid.

EXAMPLE 6

Heating 10.0 g. of 4-trifluoromethylanthranilic acid with 58 g. of chlorosulfonic acid at about 120° C. for three hours, pouring the resulting mixture slowly with stirring and cooling into a cold aqueous methanol solution of methylamine and working up as in Example 5 gives 5-methylsulfamoyl-4-trifluoromethylanthranilic acid.

A mixture of 3.0 g. of 5-methylsulfamoyl-4-trifluoromethylanthranilic acid and 1.1 g. of benzaldehyde is heated at 140° C. for about two hours. The mixture poured into water and filtered to give the N-benzylidene intermediate which is reduced with sodium borohydride in aqueous methanol as in Example 2 to give N-benzyl-5-methylsulfamoyl-4-trifluoromethylanthranilic acid.

Similarly, using hexylamine in place of methylamine in the above procedure the product is N-benzyl-5-hexylsulfamoyl-4-trifluoromethylanthranilic acid.

EXAMPLE 7

A mixture of 5.7 g. of 5-sulfamoyl-4-trifluoromethylanthranilic acid and 1.9 g. of 3-furaldehyde is heated at about 135–140° C. for two hours to give, after cooling, adding water and filtering N-(3-furylmethylene)-5-sulfamoyl - 4 - trifluoromethylanthranilic acid. Reducing this intermediate with sodium borohydride as in Example 2 gives N-(3-furylmethyl)-5-sulfamoyl-4-trifluoromethylanthranilic acid.

EXAMPLE 8

A mixture of 2.8 g. of 5-sulfamoyl-4-trifluoromethylanthranilic acid and 1.1 g. of 3-thiophenecarboxaldehyde is heated at about 140° C. for 2.5 hours. Cooling, adding water and filtering gives N-(3-thenylidene)-5-sulfamoyl-4-trifluoromethylanthranilic acid. This intermediate is treated with 0.5 g. of sodium hydroxide in water and the resulting aqueous solution is hydrogenated at room temperature using a palladium-on-charcoal catalyst until an equimolar amount of hydrogen is taken up. The mixture is filtered, acidified with hydrochloric acid and the solid product is isolated by filtration to give N-(3-thenyl)-5-sulfamoyl-4-trifluoromethylanthranilic acid.

EXAMPLE 9

| Ingredients: | Amounts, mg. |
|---|---|
| N-furfuryl-5-sulfamoyl - 4 - trifluoromethylanthranilic acid | 250 |
| Magnesium stearate | 10 |
| Lactose | 200 |

The above ingredients are screened through a #40 mesh screen, then mixed well in a mixer and filled into a hard gelatin capsule.

EXAMPLE 10

| Ingredients: | Amounts, mg. |
|---|---|
| 5-sulfamoyl-N-(2-thenyl) - 4 - trifluoromethyl-anthranilic acid | 150 |
| Magnesium stearate | 5 |
| Lactose | 250 |

The above ingredients are screened, mixed and filled into a hard gelatin capsule.

EXAMPLE 11

| Ingredients: | Amounts, mg. |
|---|---|
| N-furfuryl-5-sulfamoyl - 4 - trifluoromethylanthranilic acid | 5 |
| Calcium sulfate, dihydrate | 120 |
| Sucrose | 25 |
| Starch | 15 |
| Talc | 5 |
| Stearic acid | 3 |

The N-furfuryl-5-sulfamoyl-4-trifluoromethylanthranilic acid, calcium sulfate, dihydrate and sucrose are mixed and granulated with hot 10% gelatin solution. The wetted mass is passed through a #6 mesh screen directly onto drying trays. The granules are dried at 120° F. and passed through a #20 mesh screen. These granules are mixed with the starch, talc and stearic acid, screened and then compressed into a tablet.

EXAMPLE 12

| Ingredients: | Amounts, mg. |
|---|---|
| N-benzyl - 5 - sulfamoyl - 4 - trifluoromethylanthranilic acid | 100 |
| Peanut oil | 250 |

The above ingredients are mixed to form a thick slurry and filled into a soft gelatin capsule.

EXAMPLE 13

| Ingredients: | Amounts, mg. |
|---|---|
| N-furfuryl-5-sulfamoyl - 4 - trifluoromethylanthranilic acid | 50 |
| 2,4,7-triamino-6-phenylpteridine | 50 |
| Talc | 150 |

The above ingredients are mixed, screened and filled into a capsule.

EXAMPLE 14

| Ingredients: | Amounts, mg. |
|---|---|
| 5-sulfamoyl-N-(2-thenyl) - 4 - trifluoromethyl-anthranilic acid | 25 |
| 2,4,7-triamino-6-phenylpteridine | 100 |
| Calcium sulfate, dihydrate | 100 |
| Sucrose | 15 |
| Starch | 10 |
| Talc | 5 |
| Stearic acid | 3 |

By the procedure of Example 11, a tablet is formed from the above ingredients.

EXAMPLE 15

| Ingredients: | Amounts, mg. |
|---|---|
| N,N-dibenzyl - 5 - sulfamoyl-4-trifluoromethyl-anthranilic acid | 100 |
| 2,4,7-triamino-6-p-chlorophenylpteridine | 50 |
| Lactose | 150 |

The above ingredients are mixed and filled into a capsule.

EXAMPLE 16

The anthranilic acids of Formula I produce diuretic activity as shown in the test in saline loaded rats at doses of 15 to 90 mg./kg. orally and at doses of 30 mg./kg. subcutaneously and in the test in water loaded (2.5% body weight) dogs at doses of 12.5 to 25 mg./kg. orally.

These anthranilic acids produce hypotensive activity in neurogenic hypertensive dogs at doses of 25 mg./kg. orally.

Combinations of the anthranilic acids of Formula I and the pteridines of Formula II produce diuretic activity as shown in renal clearance tests in phosphate mannitol infused dogs by administering the anthranilic acid at a priming dose of 0.1 mg./kg. intravenously and intravenous infusion of 0.15 mg./kg. per hour plus the pteridine at a priming dose of 3 mg./kg. intravenously and intravenous infusion of 3 mg./kg. per hour.

What is claimed is:

1. A dosage unit in the form of a tablet, capsule, troche, lozenge or parenteral liquid for internal administration to produce diuresis consisting of a pharmaceutical carrier; from about 5 mg. to about 250 mg. of an anthranilic acid selected from the group consisting of a compound of the formula:

$$\begin{array}{c} F_3C-\phantom{xx}-R_2 \\ R_1HNSO_2-\phantom{xx}-COOH \end{array}$$

in which:

$R_1$ is a member selected from the group consisting of hydrogen and lower alkyl having 1 to 6 carbon atoms and $R_2$ is a member selected from the group consisting of furylmethylamino, thenylamino, benzylamino and dibenzylamino and a salt formed with the carboxylic acid moiety thereof, and from about 5 mg. to about 250 mg. of a pteridine compound of the formula:

[pteridine structure with substituents $R_3$, $R_4$]

in which:

$R_3$ is a member selected from the group consisting of hydrogen and lower alkyl having 1 to 3 carbon atoms and $R_4$ is a member selected from the group consisting of hydrogen, lower alkyl having 1 to 3 carbon atoms, trifluoromethyl, halo and lower alkoxy having 1 to 3 carbon atoms.

2. A dosage unit according to claim 1 in which in the anthranilic acid, $R_1$ is hydrogen and $R_2$ is furylmethylamino and in the pteridine, compound $R_3$ and $R_4$ are hydrogen.

3. The method of producing diuresis which comprises administering internally to an animal organism a compound selected from the group consisting of an anthranilic acid of the formula:

$$\begin{array}{c} F_3C-\phantom{xx}-R_2 \\ R_1HNSO_2-\phantom{xx}-COOH \end{array}$$

in which:

$R_1$ is a member selected from the group consisting of hydrogen and lower alkyl having 1 to 3 carbon atoms and $R_2$ is a member selected from the group consisting of furylmethylamino, thenylamino, benzylamino and dibenzylamino and a salt formed with the carboxylic acid moiety thereof in a daily dosage of from about 5 mg. to about 1000 mg.; and a pteridine compound of the formula:

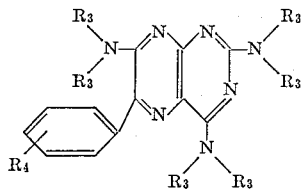

in which:

$R_3$ is a member selected from the group consisting of hydrogen and lower alkyl having 1 to 3 carbon atoms and $R_4$ is a member selected from the group consisting of hydrogen, lower alkyl having 1 to 3 carbon atoms, trifluoromethyl, halo and lower alkoxy having 1 to 3 carbon atoms in a daily dosage of from about 5 mg. to about 1000 mg.

4. The method according to claim 3 in which in the anthranilic acid $R_1$ is hydrogen and $R_2$ is furylmethylamino and in the pteridine compound $R_3$ and $R_4$ are hydrogen.

References Cited

UNITED STATES PATENTS

| 3,081,230 | 3/1963 | Weinstock | 424—246 |
| 3,058,882 | 10/1962 | Sturm et al. | 167—51.5 |
| 3,066,156 | 11/1962 | Ziegler | 260—397.7 |

FOREIGN PATENTS

| 1,122,541 | 8/1962 | Germany. |

STANLEY J. FRIEDMAN, Primary Examiner

U.S. Cl. X.R.

424—228, 251; 260—239.6, 397.7, 516